United States Patent
Lee et al.

(10) Patent No.: US 7,773,946 B2
(45) Date of Patent: Aug. 10, 2010

(54) METHOD AND APPARATUS FOR TRANSMITTING/RECEIVING DATA IN A CELLULAR COMMUNICATION SYSTEM

(75) Inventors: Kwang-Bok Lee, Seoul (KR); Hui-Won Je, Gwacheon-si (KR); Seung-Hoon Nam, Seoul (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 841 days.

(21) Appl. No.: 11/235,039

(22) Filed: Sep. 26, 2005

(65) Prior Publication Data

US 2006/0176859 A1 Aug. 10, 2006

(30) Foreign Application Priority Data

Feb. 4, 2005 (KR) .................... 10-2005-0010771

(51) Int. Cl.
*H04B 1/00* (2006.01)
(52) U.S. Cl. .......... 455/45; 455/436; 455/41.2; 455/501; 375/260; 375/148; 375/222; 375/254; 375/335; 370/335; 370/480
(58) Field of Classification Search ............. 455/402, 455/445
See application file for complete search history.

(56) References Cited

U.S. PATENT DOCUMENTS 6,188,717 B1 * 2/2001 Kaiser et al. ............. 375/148
7,224,741 B1 * 5/2007 Hadad .................. 375/260
7,301,890 B2 * 11/2007 Joo et al. ................ 370/208
2003/0211831 A1 * 11/2003 Xu et al. ................. 455/63.3
2004/0208232 A1 * 10/2004 Sudo ..................... 375/146
2005/0094597 A1 * 5/2005 Hwang et al. ........... 370/329
2006/0240827 A1 * 10/2006 Dunn et al. ............. 455/436
2008/0089223 A1 * 4/2008 Wu et al. ................ 370/209

OTHER PUBLICATIONS

Shinsuke Hara et al., "Design and Performance of Multicarrier CDMA System in Frequency-Selective Rayleigh Fading Channels", IEEE Transactions on Vehicular Technology, vol. 48, No. 5, Sep. 1999.

* cited by examiner

*Primary Examiner*—Charles N Appiah
*Assistant Examiner*—Randy Peaches
(74) *Attorney, Agent, or Firm*—NSIP Law

(57) ABSTRACT

Disclosed is a method and apparatus for transmitting data in a cellular communication system including at least one base station that communicates with a plurality of mobile stations through a given frequency band. The method and apparatus divides the frequency band into at least two subcarrier groups each including a plurality of subcarriers; allocates at least one subcarrier group to each mobile station, and changes the subcarrier group allocated to each mobile station according to a predetermined period; and codes data to be transmitted to each mobile station with a plurality of codes, and transmits modulation symbols obtained by performing inverse fast Fourier transform (IFFT) on a plurality of subcarriers of the allocated subcarrier group.

17 Claims, 6 Drawing Sheets

METHOD AND APPARATUS FOR TRANSMITTING/RECEIVING DATA IN A CELLULAR COMMUNICATION SYSTEM

PRIORITY

This application claims priority under 35 U.S.C. §119 to an application entitled "Method and Apparatus for Transmitting/Receiving Data in a Cellular Communication System" filed in the Korean Intellectual Property Office on Feb. 4, 2005 and assigned Serial No. 2005-10771, the contents of which are incorporated herein by reference.

BACKGROUND OF THE INVENTION

1. Field of the Invention

The present invention relates generally to multiple access technology in a cellular communication system, and in particular, to a method and apparatus for allocating an uplink resource and transmitting/receiving data therethrough.

2. Description of the Related Art

In general, a cellular system supporting $2^{nd}$ generation (2G) and $3^{rd}$ generation (3G) mobile communication uses Direct Sequence Code Division Multiple Access (DS-CDMA) technology. The DS-CDMA technology multiplies transmission data by a spreading code, and then spreads the transmission data in a frequency band before transmission.

The DS-CDMA technology is disadvantageous in that it suffers from severe multipath fading. The multipath fading causes interference between adjacent symbols. Rake receivers are used to overcome the multipath fading.

However, the use of Rake receivers causes an increase in complexity of a receiving apparatus. In addition, it is difficult to achieve multiplexing gain for multiple users in a frequency domain using broadband characteristics, and hard to use a high-speed modulation technique due to interference between users.

For these reasons, it is not appropriate to use the DS-CDMA technology in the next generation mobile communication system (4G) in which broadband resources will certainly be used.

Taking the foregoing into consideration, an Orthogonal Frequency Division Multiple Access (OFDMA) technology is attracting attention as a multiple access technology appropriate to achieve high-speed transmission required by the next generation mobile communication system. The OFDMA technology finely divides a broadband frequency into a plurality of narrowband frequencies (or subcarriers), and allocates the subcarriers per user. In this way, the OFDMA technology can increase a length of user symbols, maintaining a data rate.

The interference between adjacent symbols due to multipath fading is relieved by adding a guard time having the same pattern to the user symbols. It is easy to obtain multiplexing gain for multiple users by allocating subcarriers with high channel gain on a per-user basis. In addition, because the frequency resource is finely subdivided, the OFDMA technology is appropriate to obtain resource management gain, such as multiuser gain. For these reasons, various OFDMA-based multiple access technologies have been proposed in recent years.

Typically, Multi-Carrier CDMA (MC-CDMA) and Frequency Hopping OFDMA (FH-OFDMA) technologies are attracting attention as a technology that is superior in relieving interference from an adjacent cell and is appropriate for the cellular environment.

The MC-CDMA technology allocates different codes to different users, and spreads the codes in a frequency band, thereby identifying users. Resource allocation in the MC-CDMA technology is shown in FIG. 1. In FIG. 1, the full frequency band is divided per predetermined sub-frequency (SF) band, and in each sub-frequency band, different codes are allocated to the users. That is, code #1 to code #K are allocated to user #1 to user #K, respectively. Therefore, each of the users spreads transmission data with a code allocated thereto in the corresponding sub-frequency band before transmission.

Therefore, the application of the MC-CDMA technology can relieve interference from an adjacent cell, and scatters the spread chips over the frequency band, thereby achieving frequency multiplexing. However, in the case of an uplink, signals are received at a base station from the users over different channels. Therefore, it is difficult to restore orthogonality between the codes by distinguishing various user signals received through the same subcarrier.

However, the use of the conventional linearized receiver such as a Maximal Ratio Combining (MRC) receiver causes severe performance degradation. This is well disclosed in "Design and Performance of Multicarrier CDMA System in Frequency Selective Fading Channels" submitted to IEEE Transactions on Vehicular Technology by Prasad in 1999.

The FH-OFDMA technology allows a user to continuously avoid fading through frequency hopping, and can obtain frequency multiplexing gain by being combined with channel coding. Resource allocation in the FH-OFDMA technology is shown in FIG. 2. In FIG. 2, a frequency band is divided into a plurality of subcarriers, and the subcarriers are allocated on a per-user basis. The subcarriers are allocated to the users not on a fixed basis, but on a time-varying basis. That is, a set of subcarriers allocated to a particular user is subject to dynamic change according to fading characteristics of a radio transmission line. This is called "dynamic resource allocation" or "frequency hopping."

The use of the FH-OFDMA technology allows even interference from the adjacent cell to undergo frequency hopping, so that the subcarriers in use do not always suffer from interference. Therefore, the FH-OFDMA technology, if combined with channel coding to level (or equalize) the interference, can relieve the interference from the adjacent cell. However, in the uplink, all users must perform channel estimation every hop, increasing a load caused by pilot signals. In particular, application of a coherent modulation/demodulation technique further increases the pilot load.

In order to overcome these problems, there has been proposed a method of using a non-coherent modulation/demodulation technique after grouping several time-domain symbols. However, the non-coherent modulation/demodulation technique does not use pilot signals, causing a decrease in frequency efficiency.

The foregoing MC-CDMA and FH-OFDMA technologies use code spreading and frequency hopping, respectively, in the cellular system in order to overcome interference between adjacent cells, while obtaining frequency multiplexing gain.

However, if a load between various cells existing in the cellular system is taken into consideration, it can be more effective to use both code spreading and frequency hopping techniques by appropriately adjusting gains thereof according to the user environment, instead of using only one of the code spreading and the frequency hopping techniques. To this end, the multiple access technology for a physical layer needs to define various flexible basic resource units such that they can be appropriately adjusted by an upper layer.

In order to use the coherent modulation/demodulation technique having high frequency efficiency, it is necessary to decrease the load caused by pilot signals, taking into account the necessity to transmit the pilot signals per user. In addition, when the code spreading technique is applied to equalize interference between adjacent cells, there is a need for a multiple access technology capable of minimizing a loss caused by orthogonality damage. In particular, because the orthogonality damage occurs as a serious problem in an uplink environment where user signals are received over different channels together, there is a keen demand for a multiple access technology capable of overcoming this problem.

SUMMARY OF THE INVENTION

To meet the above demand, the present invention proposes a resource allocation method for obtaining high frequency efficiency in a cellular system environment, and a transmission/reception apparatus for the same.

In addition, the present invention proposes a resource allocation method for obtaining frequency multiplexing gain while overcoming an influence caused by interference between adjacent cells in a cellular system environment, and a transmission/reception apparatus for the same.

Further, the present invention proposes a resource allocation method capable of reducing a pilot load in a cellular system environment, and a transmission/reception apparatus for the same.

Moreover, the present invention proposes a multiple access technology capable of flexible resource management in a cellular system environment.

According to a first aspect of the present invention, there is provided a method for transmitting data in a cellular communication system including at least one base station that communicates with a plurality of mobile stations through a given frequency band. The method includes dividing the frequency band into at least two subcarrier groups each including a plurality of subcarriers; allocating at least one subcarrier group to each mobile station, and changing the subcarrier group allocated to each mobile station according to a predetermined period; and coding data to be transmitted to each mobile station with a plurality of codes, and transmitting modulation symbols obtained by performing inverse fast Fourier transform (IFFT) on a plurality of subcarriers constituting the allocated subcarrier group.

According to a second aspect of the present invention, there is provided a method for receiving data in a cellular communication system including at least one base station that communicates with a plurality of mobile stations through a given frequency band. The method includes dividing the frequency band into at least two subcarrier groups each including a plurality of subcarriers; allocating at least one subcarrier group to each mobile station, and changing the subcarrier group allocated to each mobile station according to a predetermined period; and performing fast Fourier transform (FFT) on modulation symbols received from each mobile station into a plurality of subcarriers constituting the subcarrier group allocated to the corresponding mobile station, and decoding the subcarriers into a plurality of codes.

Preferably, in the first and second aspects, the coding step includes dividing the transmission data according to the number of the codes, and coding the divided data by corresponding codes.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail with reference to the annexed drawings. In the following description, a detailed description of known functions and configurations incorporated herein has been omitted for conciseness.

A multiple access technology proposed herein is based on OFDMA technology that divides the full frequency band into N subcarriers. Herein, the multiple access technology proposed in an embodiment of the present invention will be referred to as "Frequency Hopping/Spread Spectrum-Orthogonal Frequency Division Multiple Access (FH/SS-OFDMA) technology."

A. Resource Allocation Method

With reference to the accompanying drawings, in particular with reference to FIGS. 3 and 4, a detailed description will now be made of a resource allocation method available for the FH/SS-OFDMA technology according to an embodiment of the present invention.

Figure 1:
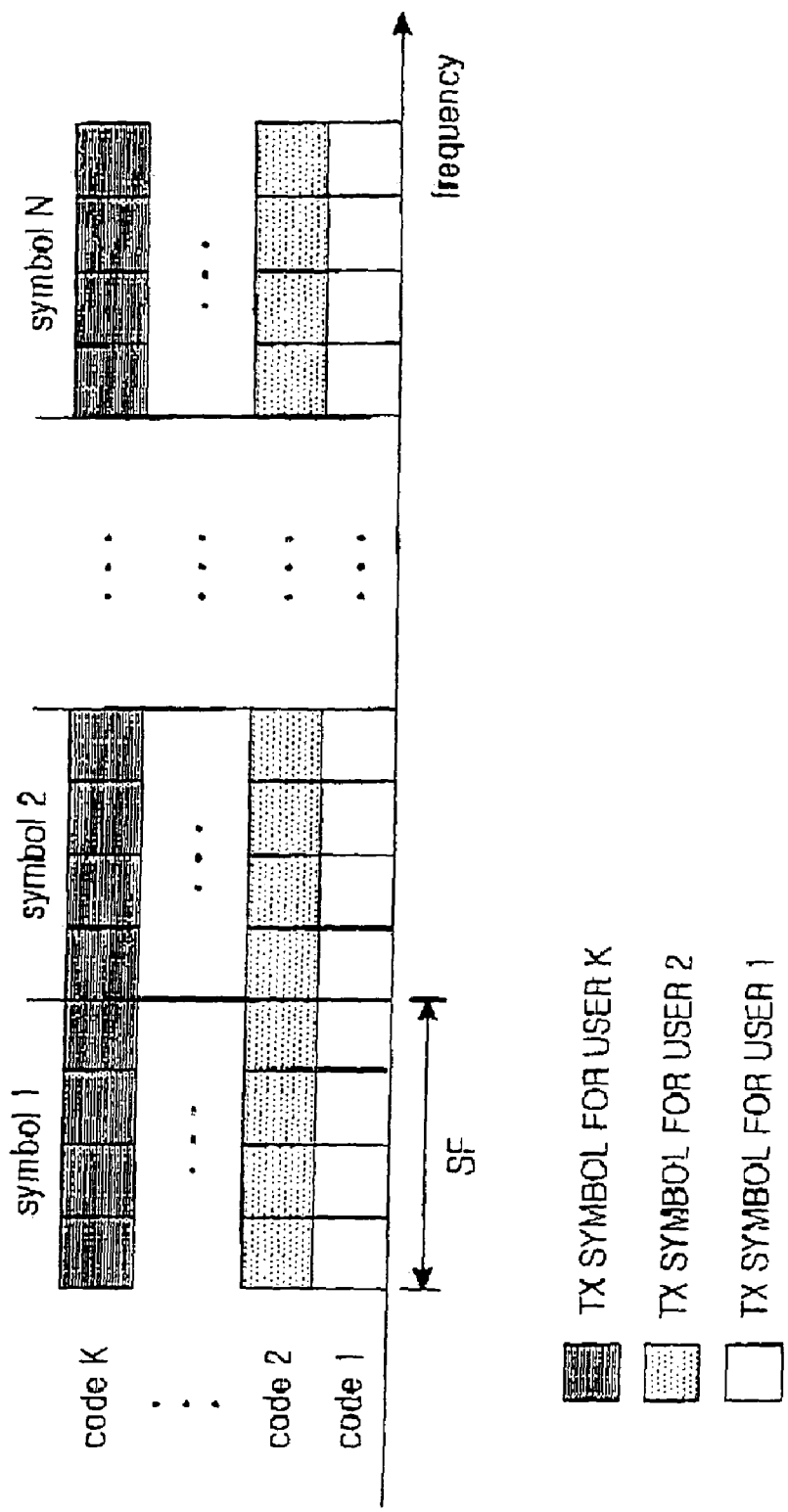
FIG. 1 is a diagram illustrating resource allocation in an MC-CDMA technology.
Figure 2:
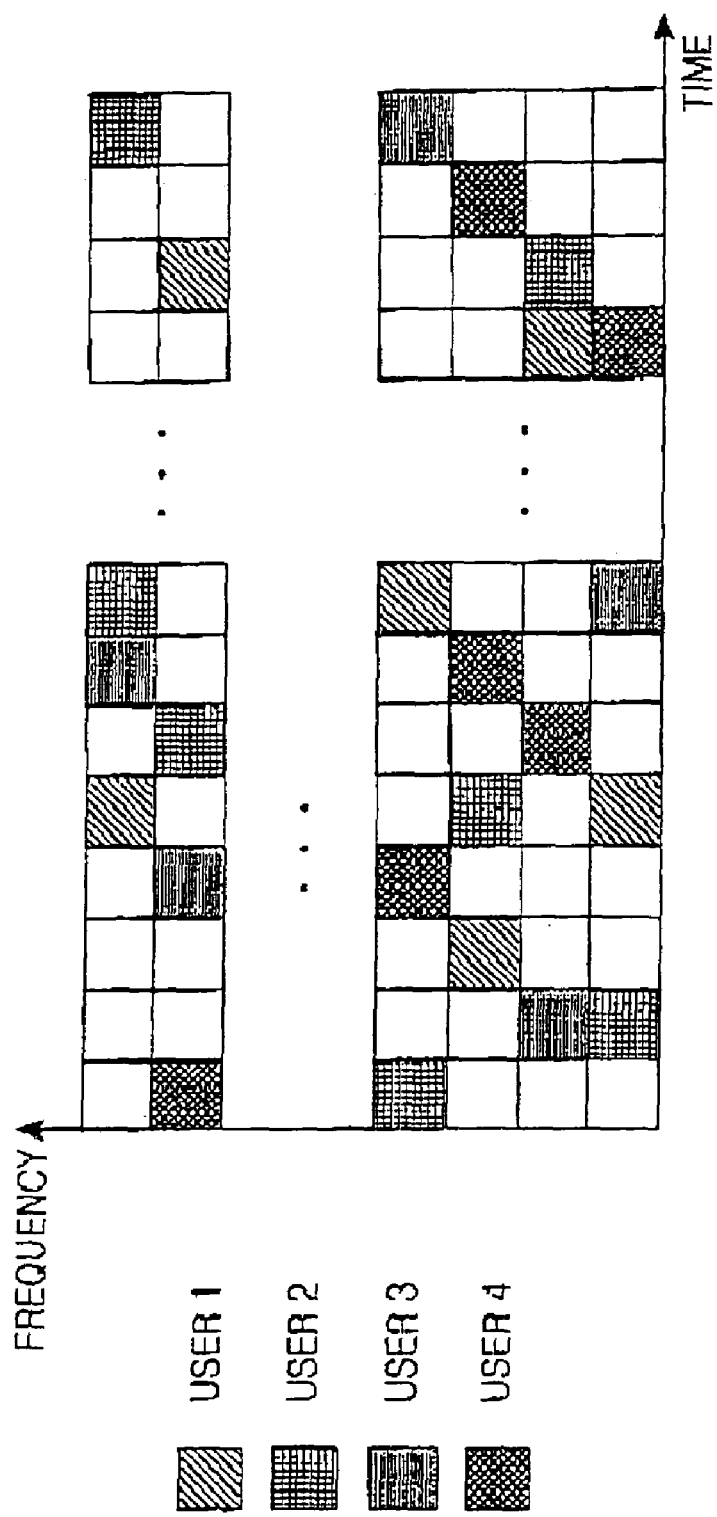
FIG. 2 is a diagram illustrating resource allocation in an FH-OFDMA technology.
Figure 3:
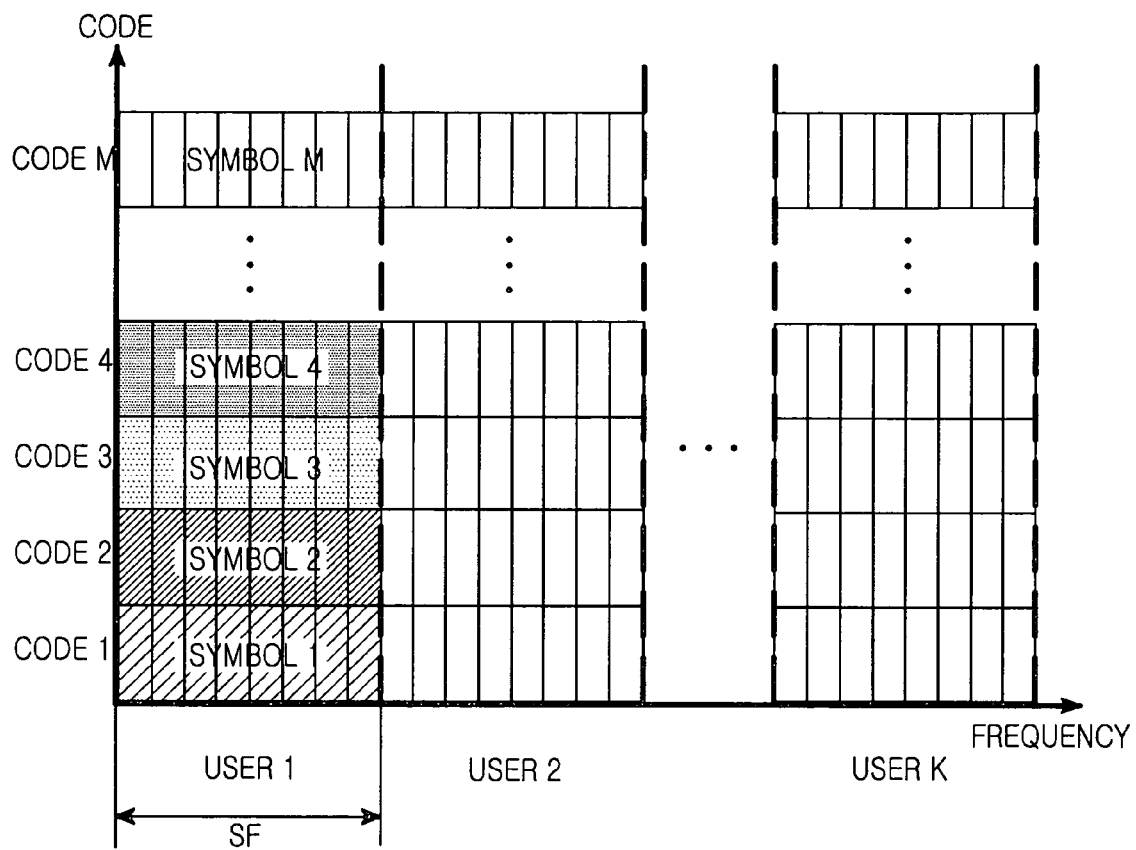
FIG. 3 is a diagram illustrating a resource allocation method in an FH/SS-OFDMA technology according to an embodiment of the present invention.
Figure 4:
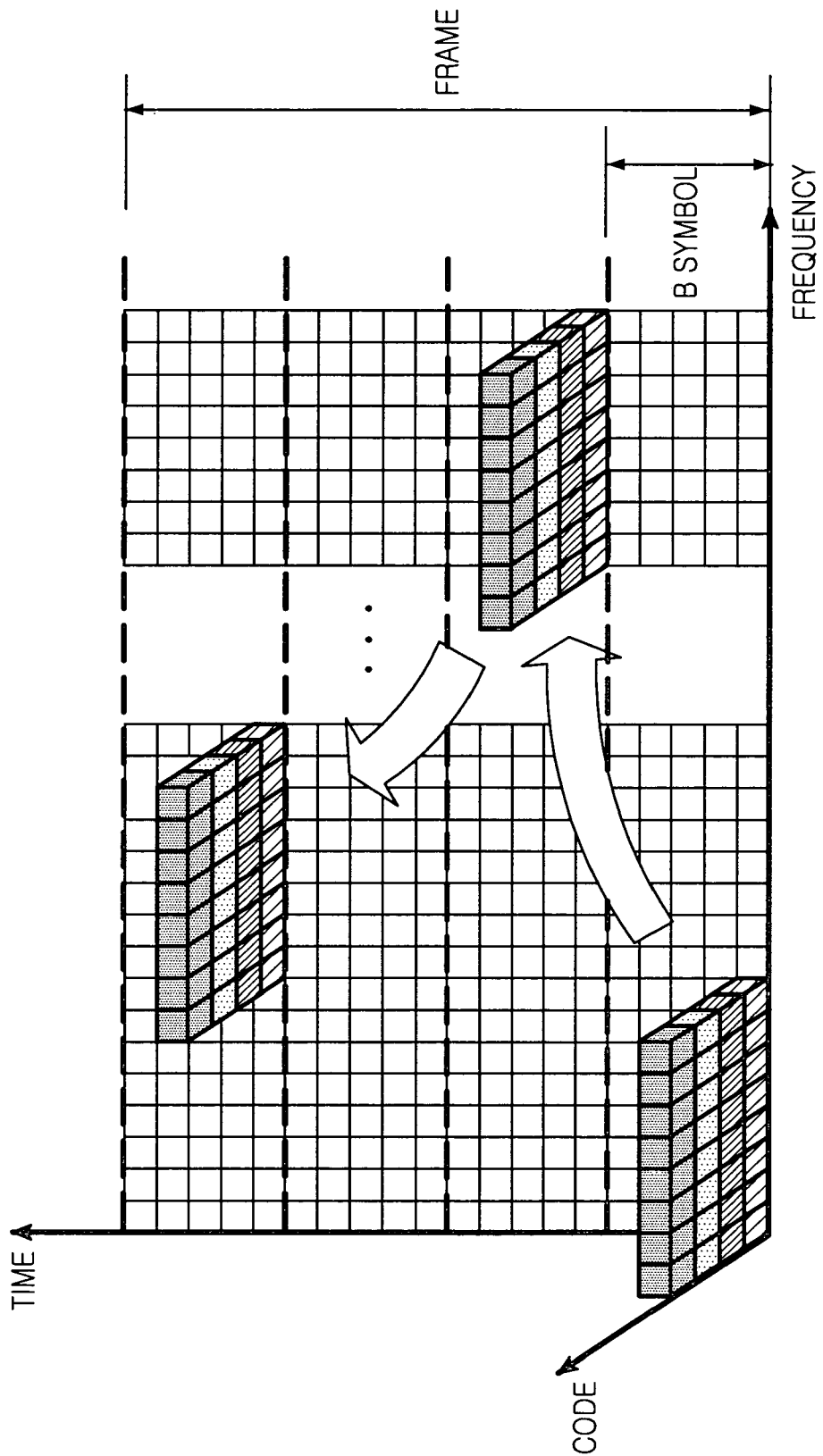
FIG. 4 is a diagram illustrating a method of group-hopping the resources allocated by FIG. 3.

Referring to FIG. 3, a frequency band is divided into a plurality of subcarrier groups. Each of the subcarrier groups includes SF adjacent subcarriers among N subcarriers. The subcarrier groups are independently allocated to users not on a fixed basis, but on a time-varying basis. In other words, frequency hopping occurs per subcarrier group.

For example, if a subcarrier group #1 is presently allocated to a user #1, a subcarrier group #2 will be allocated to the user #1 during the next transmission, and a subcarrier group #K will be allocated to the user #1 during another next transmission. In addition, M codes (code #1 through code #M) for code spreading are commonly allocated to all of the users (user #1 through user #K). FIG. 4 illustrates an example of frequency hopping that happens per subcarrier group.

Each user spreads transmission data with M codes (code #1 through code #M) allocated thereto, and transmits the spread transmission signal through subcarriers in the subcarrier group allocated thereto. Herein, M symbols transmitted at the same time in one subcarrier group for each user is defined as one hop.

In addition, hops which are subject to frequency hopping not every symbol period but every predetermined number of symbol periods, are defined as one channel. This is to compensate for an increase in a basic resource management unit due to an increase in a transmission unit when one user simultaneously transmits several symbols. A basic unit of the symbol period is determined by a data rate of a user who requires the minimum data rate. For a user requiring a data rate higher than the minimum data rate, the number L of channels allocated thereto is increased according to system conditions, or the number M of symbols spread in one hop is increased up to a maximum of SF.

Further, pilot symbols can be transmitted through at least one subcarriers allocated to a hop such that channel estimation is possible at a reception side. SF subcarriers allocated to one hop are concatenated, so that several subcarriers in one hop experience flat fading, if possible. This maintains orthogonality between codes, and enables correct channel estimation with only the pilot symbols transmitted through at least one subcarrier.

It is advantageous to set the SF to a small value in order to allow the subcarriers to experience flat fading. However, as a value of SF increases, a spreading gain increases. The SF must be determined taking both of the two opposite conditions into account. In the frequency domain, it is preferable to set the SF to a small value taking into consideration a coherence band that becomes an index indicating a fading level.

As described above, the resource allocation method according to an embodiment of the present invention divides a frequency band into a plurality of subcarrier groups and allocates resources to users per subcarrier group. The method allows each user to use all codes in the subcarrier group allocated thereto. In addition, for frequency hopping, the method changes the allocated subcarrier group to be used by each user at each transmission.

B. Transmission Apparatus

With reference to the accompanying drawings, in particular with reference to FIG. 5, a detailed description will now be made of a transmission apparatus for transmitting data through resource allocation according to an embodiment of the present invention.

Figure 5:
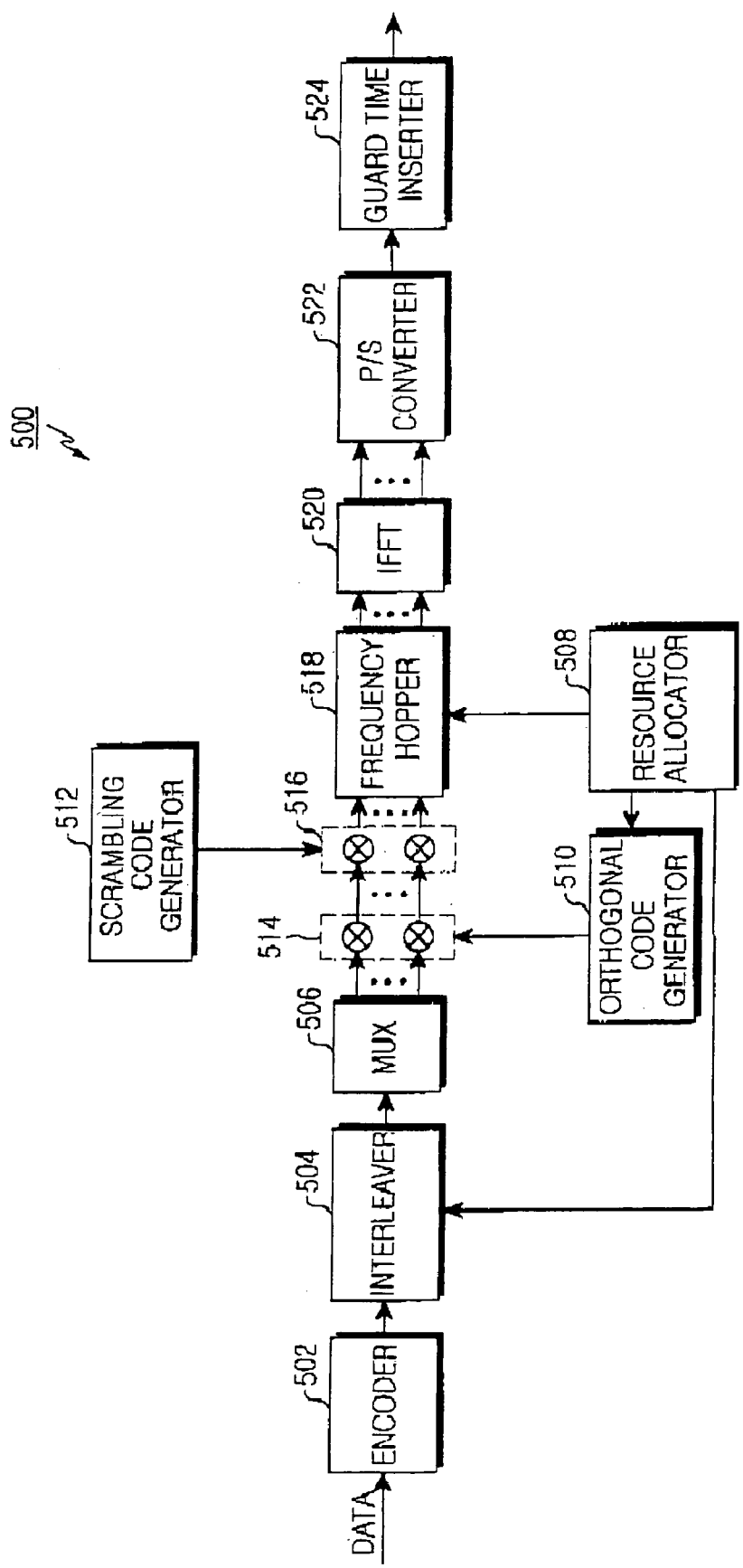
FIG. 5 is a diagram illustrating a structure of a transmission apparatus for resource allocation according to an embodiment of the present invention.

A transmission apparatus 500 shown in FIG. 5 includes an encoder 502, an interleaver 504, a multiplexer (MUX) 506, a resource allocator 508, an orthogonal code generator 510, a scrambling code generator 512, a first spreader 514, a second spreader 516, a frequency hopper 518, an inverse fast Fourier transform (IFFT) unit 520, a parallel-to-serial (P/S) converter 522, and a guard time inserter 524.

Referring to FIG. 5, transmission data is provided to the encoder 502. The encoder 502 encodes the transmission data, and provides coded bits to the interleaver 504. The interleaver 504 interleaves the coded bits according to a predetermined pattern, and provides the interleaved coded bits to the multiplexer 506. The multiplexer 506 multiplexes the interleaved coded bits into a plurality of coded bit streams, and provides the coded bit streams to their associated multipliers constituting the first spreader 514.

The first spreader 514 multiplies the input coded bit streams by allocated orthogonal codes. That is, the first spreader 514 spreads an input coded bit stream by a predetermined orthogonal code, and outputs a spread coded bit stream with a length=SF for each coded bit constituting the coded bit stream. The SF corresponds to a length of the orthogonal code. The orthogonal codes used in the first spreader 514 are generated from the orthogonal code generator 510.

The orthogonal code generator 510 generates orthogonal codes under the control of the resource allocator 508. Therefore, the resource allocator 508 determines the SF of the orthogonal code, and provides information thereon to the orthogonal code generator 510. The SF must be set greater than a predetermined value so that sufficient code spreading gain can be obtained, and must also be set less than a predetermined value so that subcarriers do not experience selective fading. This is to maintain the orthogonality between codes after performing code spreading in the frequency domain using the orthogonal codes. Therefore, it is preferable to select the SF having a value less than the set value taking into account a coherence band that serves as an index indicating frequency selectivity in the fading channel. Walsh codes, the SF of which can be adjusted in units of an exponent of 2, can be used as the orthogonal codes.

The coded bit streams that had undergone code spreading are provided to their associated multipliers of the second spreader 516. The second spreader 516 multiplies the code-spread coded bit streams by allocated scrambling codes. That is, the second spreader 516 multiplies the code-spread coded bit streams by the scrambling codes having the same spreading gain of the SF so that intercell resource allocation is possible. PN codes or Gold codes are used as the scrambling codes to reduce or eliminate intercell interference. The scrambling codes used in the second spreader 516 are generated from the scrambling code generator 512.

The bit streams spread by the scrambling code are input to the frequency hopper 518 hop by hop. Each hop includes at least one pilot symbol. One hop is allocated to one channel per symbol period B. Therefore, the frequency hopper 518 allows each hop to undergo frequency hopping according to a predetermined pattern. The symbol period B is defined as a unit period of one or more symbols by the resource allocator 508. An increase in the symbol period B decreases the number of hops used in one channel, causing a decrease in data rate per channel. In contrast, a decrease in the symbol period B increases the data rate per channel. Therefore, a size of the B is defined as a unit of the minimum data rate such that a user requiring the minimum data rate occupies one channel, thereby increasing fineness of radio resources and enabling efficient resource utilization.

The IFFT unit 520 converts the signals that were allocated to frequency-domain subcarriers by frequency hopping, into time-domain modulation symbol streams. The P/S converter 522 serial-converts the time-domain modulation symbol streams provided from the IFFT unit 520. Thereafter, in order to reduce intersymbol interference and multipath fading, the guard time inserter 524 inserts a signal having the same phase as that of the original signal in each modulation symbol stream as a guard time, and transmits the guard time-inserted signal to a base station.

C. Reception Apparatus

With reference to the accompanying drawings, in particular with reference to FIG. 6, a detailed description will now be made of a reception apparatus for receiving data through resource allocation according to an embodiment of the present invention.

Figure 6:
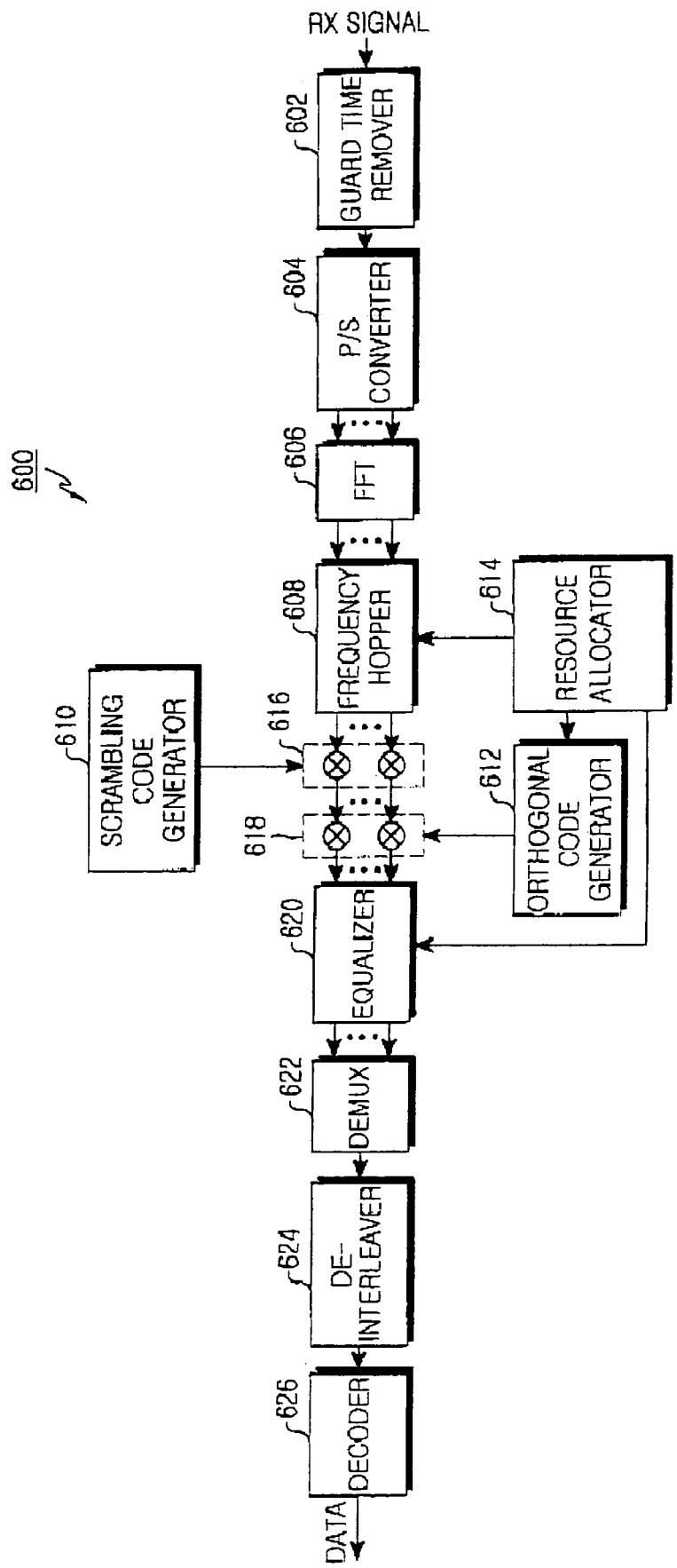
FIG. 6 is a diagram illustrating a structure of a reception apparatus for resource allocation according to an embodiment of the present invention.

A reception apparatus 600 shown in FIG. 6 includes a guard time remover 602, a serial-to-parallel (S/P) converter 604, a fast Fourier transform (FFT) unit 606, a frequency hopper 608, a scrambling code generator 610, an orthogonal code generator 612, a resource allocator 614, a first despreader 616, a second despreader 618, an equalizer 620, a demultiplexer (DIMUX) 622, a deinterleaver 624, and a decoder 626.

Referring to FIG. 6, a base station receives signals transmitted from several users, each of which experience different channels. The received signal is provided to the guard time remover 602. The guard time remover 602 removes a guard time inserted in the received signal, and provides the guard time-removed signal to the S/P converter 604. The S/P converter 604 parallel-converts the guard time-removed signal into parallel signals, and provides the parallel signals to the FFT unit 606. The FFT unit 606 performs FFT on each of the time-domain parallel signals, and outputs frequency-domain parallel signals.

The frequency hopper 608 allows each of the frequency-domain parallel signals to undergo frequency hopping according to a predetermined frequency hopping pattern. The frequency hopping pattern is equal to the frequency hopping pattern used in the transmission apparatus for a user desiring to perform demodulation. That is, the frequency-domain parallel signals are input to the frequency hopper 608 hop by hop. Each hop includes at least one pilot symbol. One hop is allocated to one channel per symbol period B. Therefore, the frequency hopper 608 allows each hop to undergo frequency hopping according to a predetermined pattern. The symbol period B is defined as a unit period of one or more symbols by the resource allocator 614. An increase in the symbol period B decreases the number of hops used in one channel, causing a decrease in data rate per channel. In contrast, a decrease in the symbol period B increases the data rate per channel. Therefore, a size of the symbol period B is defined as a unit of the minimum data rate such that a user requiring the minimum data rate occupies one channel, thereby increasing fineness of radio resources and enabling efficient resource utilization.

The signal streams that underwent frequency hopping are input to their associated multipliers of the first despreader 616. The first despreader 616 multiplies the signal streams that underwent frequency hopping by allocated scrambling codes. PN codes or Gold codes are used as the scrambling codes. The scrambling codes used in the first despreader 616 are generated from the scrambling code generator 610.

The signal streams despread by the scrambling codes are provided to their associated multipliers of the second despreader 618. The second despreader 618 multiplies the received signal streams by allocated orthogonal codes. The received signal streams are coded bit streams spread by an orthogonal code with a length=SF. Therefore, the second despreader 618 despreads the signal streams by predetermined orthogonal codes, thereby acquiring their original bit streams before being spread. The orthogonal codes used in the second despreader 618 are generated from the orthogonal code generator 612.

The orthogonal code generator 612 generates orthogonal codes under the control of the resource allocator 614. The resource allocator 614 determines the SF of the orthogonal code, and provides information thereon to the orthogonal code generator 612. The SF must be set greater than a predetermined value so that sufficient code spreading gain can be obtained, and must also be set less than a predetermined value so that subcarriers do not experience selective fading. This is to maintain the orthogonality between codes after performing code spreading in the frequency domain using the orthogonal codes. Therefore, it is preferable to select the SF having a value less than the set value taking into account a coherence band that serves as an index indicating frequency selectivity in the fading channel. Walsh codes, the SF of which can be adjusted in units of an exponent of 2, can be used as the orthogonal codes.

Through the despreading process, the reception apparatus acquires M symbols including at least one pilot symbol for each hop. The equalizer 620 performs channel compensation and equalization based on channel information acquired from the detected pilot symbols. Preferably, a linearized equalizer is used as the equalizer 620 in order to reduce complexity of the system. Compared with other multiple access technologies, the embodiment of the present invention is advantageous in that it can maintain the orthogonality between the codes during channel compensation even though a linearized equalizer is used.

The output of the equalizer 620 is provided to the demultiplexer 622. The demultiplexer 622 sequentially separates M symbols allocated for each hop through demultiplexing, and provides the separated symbols to the deinterleaver 624. The deinterleaver 624 deinterleaves the symbol stream, and provides the deinterleaved symbol stream to the decoder 626. The decoder 626 decodes the deinterleaved symbol stream, thereby obtaining the original data transmitted by the corresponding user.

To sum up, the reception apparatus according to the embodiment of the present invention can perform channel estimation through pilot symbols allocated to each hop, so it can use a coherent decoder, contributing to an improvement in frequency efficiency.

In addition, the present invention can adjust the number L of channels allocated to a user and the number M of symbols allocated to one channel in order to satisfy the data rate required by the user. The L channels and the M symbols are resource allocation parameters. In the entire cellular system, an increase in the L channels contributes to a reduction in interference and an increase in frequency multiplexing gain, but increases generation probability of an interference signal. In contrast, an increase in the M symbols contributes to a reduction in the generation probability of the interference signal, but increases a level of an interference signal, if generated. Therefore, it is possible to obtain the optimal frequency efficiency by adjusting the L and the M parameters, taking into consideration the amount of traffic, a level of interference between adjacent cells, and a distance between a user and a base station, and the user requirements. In addition, the present invention allows the base station to use only the allocated resources during signal transmission by determining the amount of resources allocated to the uplink/downlink and transmitting the determined resource allocation information to the users for the uplink.

As can be understood from the foregoing description, the present invention can relieve the intercell interference problem of the cellular system by using both code spreading and frequency hopping. In particular, the present invention can adjust an effect of the code spreading and an effect of the frequency hopping according to the number of users, the amount of traffic, a level of intercell interference, a distance between a user and a base station, and user requirements, thereby contributing to flexible resource management. In addition, the present invention can maximize an effect of equalizing interference signals received from adjacent cells.

In addition, the present invention can prevent the orthogonality damage problem between codes in the system that uses code spreading technology in the frequency domain of the uplink. Further, the present invention can support various data rates using a data rate of the user requiring the minimum data rate as a basic unit, and can use coherent modulation/demodulation technology even in the uplink by reducing a load of pilot signals, thereby increasing, frequency efficiency.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting data in a cellular communication system including at least one base station that communicates with a plurality of mobile stations through a given frequency band, the method comprising:

dividing the frequency band into at least two subcarrier groups each including a plurality of subcarriers;

allocating at least one subcarrier group to each mobile station, and for each mobile station, changing the subcarrier group previously allocated to that mobile station into a different subcarrier group among the divided subcarrier groups, according to a predetermined period; and coding data to be transmitted to each mobile station with a plurality of codes, and transmitting modulation symbols obtained by performing inverse fast Fourier transform (IFFT) on a plurality of subcarriers of the allocated subcarrier group.

2. The method of claim 1, wherein the subcarrier group includes a plurality of consecutive subcarriers in the frequency band.

3. The method of claim 1, wherein the number of subcarriers of the subcarrier group is determined taking flat fading and spreading gain into consideration.

4. The method of claim 1, wherein the number of the subcarrier groups is equal to the number of the mobile stations.

5. The method of claim 1, wherein the period is predetermined according to a unit of a minimum data rate required in the cellular communication system.

6. The method of claim 1, wherein the plurality of codes are commonly used by the mobile stations.

7. The method of claim 1, wherein each of the modulation symbols includes at least one pilot symbol.

8. The method of claim 1, wherein the coding step comprises dividing the transmission data according to number of the codes, and coding the divided data by corresponding codes.

9. The method of claim 1, wherein the step of changing the subcarrier group allocated to each mobile station is achieved according to a frequency hopping pattern given to each mobile station.

10. A method for receiving data in a cellular communication system including at least one base station that communicates with a plurality of mobile stations through a given frequency band, the method comprising:

dividing the frequency band into at least two subcarrier groups each including a plurality of subcarriers;

allocating at least one subcarrier group to each mobile station, and for each mobile station, changing the subcarrier group previously allocated to that mobile station into a different subcarrier group among the divided subcarrier groups, according to a predetermined period; and performing fast Fourier transform (FFT) on modulation symbols received from each mobile station into a plurality of subcarriers of the subcarrier group allocated to the corresponding mobile station, and decoding the subcarriers into a plurality of codes.

11. The method of claim 10, wherein the subcarrier group includes a plurality of consecutive subcarriers in the frequency band.

12. The method of claim 10, wherein the number of subcarriers of the subcarrier group is determined taking flat fading and spreading gain into consideration.

13. The method of claim 10, wherein the number of the subcarrier groups is equal to the number of the mobile stations.

14. The method of claim 10, wherein the period is predetermined according to a unit of a minimum data rate required in the cellular communication system.

15. The method of claim 10, wherein the plurality of codes are commonly used by the mobile stations.

16. The method of claim 10, wherein each of the modulation symbols includes at least one pilot symbol.

17. The method of claim 10, wherein the step of changing the subcarrier group allocated to each mobile station is achieved according to a frequency hopping pattern given to each mobile station.

* * * * *